US012793288B2

(12) United States Patent
Kwon et al.

(10) Patent No.: US 12,793,288 B2
(45) Date of Patent: Nov. 10, 2026

(54) METHOD AND APPARATUS FOR GENERATING IMAGE CHANGE DATA

(71) Applicant: POSTECH RESEARCH AND BUSINESS DEVELOPMENT FOUNDATION, Pohang-si (KR)

(72) Inventors: ByungKi Kwon, Pohang-si (KR); Taehyun Oh, Pohang-si (KR); Hyeon Woo Nam, Pohang-si (KR); Ji-Yun Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 249 days.

(21) Appl. No.: 18/441,871

(22) Filed: Feb. 14, 2024

(65) Prior Publication Data

US 2025/0078326 A1 Mar. 6, 2025

(30) Foreign Application Priority Data

Aug. 29, 2023 (KR) ........................ 10-2023-0113856

(51) Int. Cl.
*G06T 11/00* (2026.01)
*G06T 3/18* (2024.01)
*G06V 10/54* (2022.01)

(52) U.S. Cl.
CPC ................ *G06T 11/00* (2013.01); *G06T 3/18* (2024.01); *G06V 10/54* (2022.01)

(58) Field of Classification Search
CPC . G06T 11/00; G06T 3/18; G06T 7/269; G06T 7/246; G06T 2207/20081; G06V 10/54; G06V 10/82; G06V 10/774
See application file for complete search history.

(56) References Cited

U.S. PATENT DOCUMENTS

2021/0383169 A1* 12/2021 Wang .................. G06F 18/2137
2022/0124257 A1* 4/2022 Zhao ...................... G06N 3/045
2022/0180447 A1* 6/2022 Kearney ................ G06N 3/045
2022/0309712 A1* 9/2022 Lee ........................... G06T 1/20

(Continued)

FOREIGN PATENT DOCUMENTS

KR 20230076721 A * 5/2023 ............. G06N 3/084

OTHER PUBLICATIONS

KR-20230076721-A (Machine Translation on Dec. 29, 2025) (Year: 2023).*

(Continued)

*Primary Examiner* — Michael Le
(74) *Attorney, Agent, or Firm* — Morgan, Lewis & Bockius LLP

(57) ABSTRACT

There is provided a method for generating image change data to be performed by an image change data generating apparatus, the method comprising, inputting an initial image and data parameters to a data generator, generating a first image and a second image respectively, within a first time interval by using the data generator based on the initial image and the data parameters, the first image and the second image being in a relationship of consecutive frames with each other, and generating a first image change data by using a pre-trained first proxy network and a second image change data by using a pre-trained second proxy network based on the first image and the second image.

14 Claims, 14 Drawing Sheets

(56) References Cited

U.S. PATENT DOCUMENTS

| | | | | |
|---|---|---|---|---|
| 2022/0383906 | A1* | 12/2022 | Mann | G06T 11/60 |
| 2023/0360437 | A1* | 11/2023 | Shin | G06F 3/012 |
| 2025/0003899 | A1* | 1/2025 | Houben | G01N 23/2251 |
| 2025/0061591 | A1* | 2/2025 | Krupani | G06T 7/248 |

OTHER PUBLICATIONS

Office Action in Korean Application No. 10-2023-0113856 dated Apr. 29, 2026, 23 pages including translation.

Che, Tongtong, et al. "SDOF-GAN: Symmetric dense optical flow estimation with generative adversarial networks." IEEE Transactions on Image Processing 30 (2021): 6036-6049.

Kong, Lingtong, and Jie Yang. "MDFlow: Unsupervised optical flow learning by reliable mutual knowledge distillation." IEEE Transactions on circuits and systems for video technology 33.2 (2022): 677-688.

Han, Yunhui, et al. "RealFlow: EM-based realistic optical flow dataset generation from videos." European conference on computer vision. Cham: Springer Nature Switzerland, 2022.

* cited by examiner

FIG. 15

| Task loss function $L_{task}(L_{target}, L_{base})$ | |
|---|---|
| Multiplication & Exponential | $(1 - \alpha \exp(\beta L_{base} / (L_{target} + \varepsilon) + \gamma))L_{target}$ |
| Multiplication & Sigmoid | $(1 + \alpha sigmoid(\beta L_{target} / (L_{base} + \varepsilon) + \gamma))L_{target}$ |
| Multiplication & Tanh | $(1 + \alpha \tanh(\beta L_{target} / (L_{base} + \varepsilon) + \gamma))L_{target}$ |
| Addition & Exponential | $L_{target} + \alpha \exp(-\beta L_{base} / (L_{target} + \varepsilon) + \gamma)$ |
| Addition & Sigmoid | $L_{target} + \alpha sigmoid(\beta L_{target} / (L_{base} + \varepsilon) + \gamma)$ |
| Addition & Tanh | $L_{target} + \alpha \tanh(\beta L_{target} / (L_{base} + \varepsilon) + \gamma)$ |

METHOD AND APPARATUS FOR GENERATING IMAGE CHANGE DATA

This work was supported by Institute of Information & communications Technology Planning & Evaluation (IITP) grant funded by the Korean government (Ministry of Science and ICT) (Project unique No.: 1711193885; Project No.: 2022-0-00124-002; R&D project: Development of human-centered artificial intelligence core technology; Research Project Title: Development of artificial intelligence technology that recognizes and utilizes one's own learning capabilities to provide appropriate results; and Project period: 2023.01.01.~2023.12.31.), and National Research Foundation of Korea (NRF) grant funded by the Korean government (Ministry of Science and ICT) (Project unique No.: 1711188221; Project No.: 2021R1C1C1006799; R&D project: Individual basic research (Ministry of Science and ICT); Research Project Title: Multispectral video motion amplification capable of penetrating visual disturbances caused by aerosols; and Project period: 2023.01.01.~2024.02.29.), and Institute of Information & communications Technology Planning & Evaluation (IITP) grant funded by the Korean government (Ministry of Science and ICT) (Project unique No.: 1711193622; Project No.: 2021-0-02068-003; R&D project: Nurturing innovative talent in information and communication broadcasting; Research Project Title: Artificial Intelligence Innovation Hub Research and Development; and Project period: 2023.01.01.~2023.12.31.).

CROSS-REFERENCE TO RELATED APPLICATION

This application claims priority to Korean Patent Application No. 10-2023-0113856, filed on Aug. 29, 2023, the entirety of which is incorporated herein by reference for all purposes.

TECHNICAL FIELD

The present disclosure relates to a method and an apparatus for generating image change data.

BACKGROUND

Optical flow is a computer vision task for finding dense pixel-by-pixel correspondences between two consecutive frames in a video. Optical flow is a key component in many practical applications, including video understanding, motion analysis, video enhancement, editing, 3D vision, and more.

Collecting training data is one of the most important factors in the field of artificial intelligence, and large training datasets are essential for research in optical flow. However, collecting sufficient optical flow labels in a real word is a challenging job. In particular, for optical flow estimation, a lot of human resources and monetary costs are needed to obtain real-world label data. Therefore, large-scale synthetic datasets are necessary for optical flow researches.

However, despite numerous researches, it is still not clear what the critical factors in building an effective synthetic dataset. Hence, there is a need for a method for efficiently synthesizing large-scale datasets for training an optical flow network.

SUMMARY

The problem to be solved by the present disclosure is to provide a method and an apparatus for generating image change data to effectively generate large-scale training data in an environment where training data is difficult to obtain.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for generating image change data to be performed by an image change data generating apparatus, the method comprising: inputting an initial image and data parameters to a data generator; generating a first image and a second image respectively, within a first time interval by using the data generator based on the initial image and the data parameters, the first image and the second image being in a relationship of consecutive frames with each other; and generating a first image change data by using a pre-trained first proxy network and a second image change data by using a pre-trained second proxy network based on the first image and the second image.

The first proxy network may be a network that is previously trained to generate third image change data by inputting a third image and a fourth image, which are included in a pre-obtained first image dataset and generated based on a second time interval, and to generate image change data in which a first loss function is minimized by calculating the first loss function based on first label data and the third image change data, wherein the first label data is extracted from the third image and the fourth image, the third image and the fourth image being in a relationship of consecutive frames with each other.

The second proxy network may be a network that is previously trained to generate fourth image change data by inputting a fifth image and a sixth image, which are included in a pre-obtained second image dataset and generated based on a third time interval, and to generate image change data in which a second loss function is minimized by calculating the second loss function based on second label data and the fourth image change data, wherein the second label data is extracted from the fifth image and the sixth image, the fifth image and the sixth image being in a relationship of consecutive frames with each other.

The method may further comprise: extracting fifth image change data as label data from the first image and the second image; and calculating a third loss function based on the first image change data and the fifth image change data, and calculating a fourth loss function based on the second image change data and the fifth image change data.

The method may further comprise: updating the data parameters based on the third loss function and the fourth loss function.

The updating the data parameters may update the data parameters by calculating a task loss based on the third loss function and the fourth loss function to update the data parameters.

The task loss may be calculated based on at least one of following equations:

$$L_{target}\left(1-\alpha e^{\left(\frac{-\beta L_{base}}{L_{target}+\epsilon}+\gamma\right)}\right);$$

$$L_{target}\left(1+\alpha sigmoid\left(\frac{\beta L_{target}}{L_{base}+\epsilon}+\gamma\right)\right);$$

$$L_{target}\left(1+\alpha\tanh\left(\frac{\beta L_{target}}{L_{base}+\epsilon}+\gamma\right)\right);$$

-continued $$L_{target} + \alpha e^{\left(\frac{-\beta L_{base}}{L_{target}+\epsilon}+\gamma\right)};$$

$$L_{target} + \alpha sigmoid\left(\frac{\beta L_{target}}{L_{base}+\epsilon}+\gamma\right);$$

and $$L_{target} + \alpha \tanh\left(\frac{\beta L_{target}}{L_{base}+\epsilon}+\gamma\right)$$

where Ltask denotes the task loss, Ltarget denotes the third loss function that is a loss function for the first proxy network, Lbase denotes the fourth loss function that is a loss function for the second proxy network, and $\alpha$, $\beta$, $\gamma$, $\epsilon$ are hyperparameters.

The second proxy network may be previously trained based on a larger amount of training data than training data used to train the first proxy network.

The updating the data parameters may update the data parameters by minimizing the third loss function and by maximizing the fourth loss function.

The data parameters may include at least one of color perturbation, geometric warping, flow field translation, and real world effects.

The real world effects may include at least one of texture noise, fog, and motion blur.

The method may be repeatedly performed until the third loss function is minimized.

Image change data generated by the first proxy network and the second proxy network may be optical flow data.

The method may further comprise: training the first proxy network or the second proxy network to generate image change data based on images generated while the method is repeatedly performed, when the third loss function is minimized.

In accordance with another aspect of the present disclosure, there is provided a method performed by an image change data generating apparatus, the method comprising: inputting data parameters to a data generator; inputting a first environment image or a second environment image to a data generator; generating a first image and a second image respectively, within a first time interval by using the data generator based on the initial image and the data parameters, the first image and the second image being in a relationship of consecutive frames with each other; generating image change data by using a pre-trained image change data generating network based on the data parameters and the first environment image or the second environment image; outputting a discrimination result value by inputting the image change data into a pre-trained discriminator; and updating the data parameters based on the discrimination result value.

The discriminator may be trained to determine whether image change data generated by using the pre-trained image change data generating network is image change data generated using the first environmental image or the second environmental image.

The discriminator may output a first discrimination value when determining that the image change data generated by using the first environment image, and a second discrimination value when determining that the image change data generated by using the second environment image.

The method may be repeatedly performed so that the discrimination result value reaches the first discrimination value.

The pre-trained discriminator may be pre-trained to determine whether image change data generated based on the first environment image or the second environment image, by using an adversarial loss function, to order to provide a basis for updating the data parameters.

In accordance with another aspect of the present disclosure, there is provided a non-transitory computer-readable storage medium storing computer-executable instructions stored therein, wherein the computer-executable instructions, when executed by a processor, cause the processor to perform a method, the method comprising: inputting an initial image and data parameters to data generator; generating a first image and a second image respectively, within a first time interval by using the data generator based on the initial image and the data parameters, the first image and the second image being in a relationship of consecutive frames with each other; and generating a first image change data by using a pre-trained first proxy network and a second image change data by using a pre-trained second proxy network based on the first image and the second image.

According to the present disclosure, data for training an optical flow network may be generated simply and efficiently.

In addition, large-scale training data may be generated not only in the field of optical flow but also in other fields where it is difficult to obtain training data in a real environment, such as semantic segmentation and depth estimation.

In addition, in various artificial intelligence fields, large-scale data required for learning deep learning models may be generated at a low cost.

The effects that can be obtained from the present invention are not limited to the effects mentioned above, and other effects not mentioned above can be clearly understood by those skilled in the art from the description below.

BRIEF DESCRIPTION OF THE DRAWINGS

FIG. 15 is a table illustrating Ltask among loss functions calculated according to an image change data generating method of the present disclosure.

DETAILED DESCRIPTION

Figure 1:
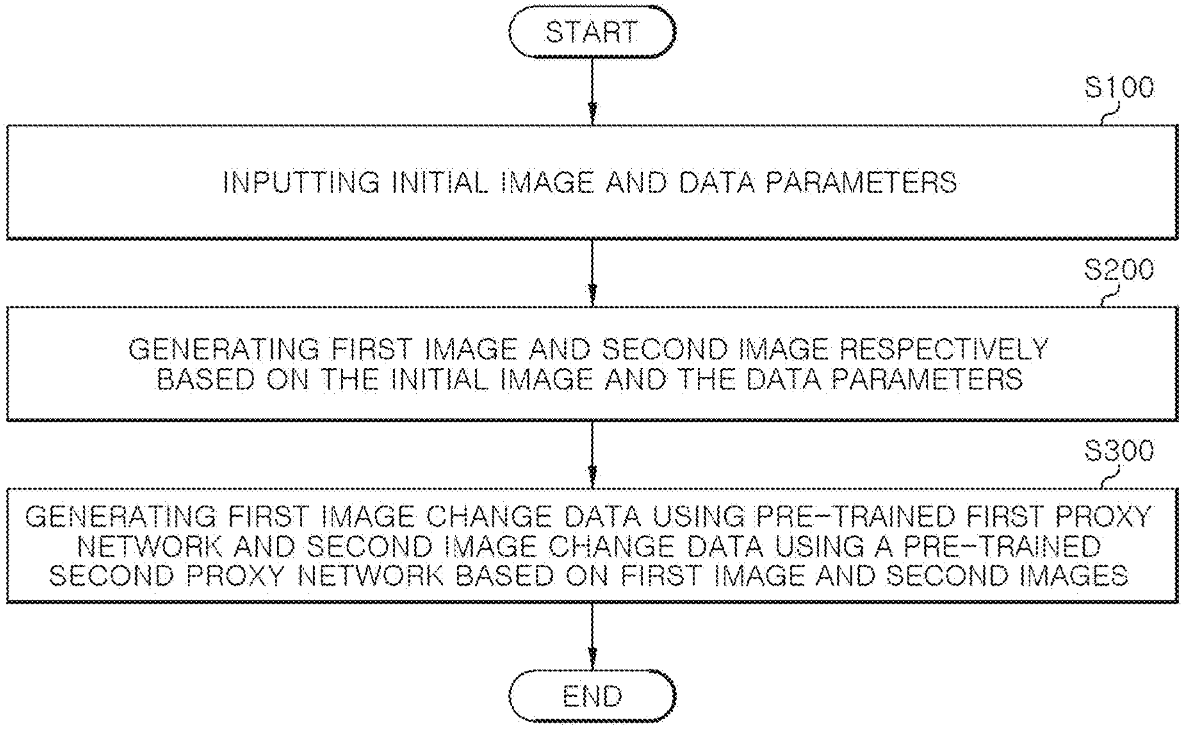
FIG. 1 is a flowchart illustrating an image change data generating method according to a first embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a flowchart illustrating an image change data generating method according to a first embodiment of the present disclosure.

Hereinafter, the above method will be described using an example that the method is performed by an image change data generating apparatus.

As shown in FIG. 1, the image change data generating method according to the first embodiment of the present disclosure includes inputting an initial image and data parameters to a data generator (S100), generating a first image and a second image respectively, within a first time interval by using the data generator based on the initial image and the data parameters, the first image and the second image being in a relationship of consecutive frames with each other (S200), and generating a first image change data by using a pre-trained first proxy network and a second image change data by using a pre-trained second proxy network based on the first image and the second image (S300).

In this specification, the first proxy network may be referred to as a target network, and the second proxy network may be referred to as a base network.

The user may update the data parameters such that a loss function corresponding to the first proxy network is minimized and a fourth loss function corresponding to the second proxy network is maximized. Image change data may be data that, in the fields of optical flow, semantic segmentation, depth estimation, etc., represent changes in pixels between multiple images, classification of a specific object or boundary of the specific object in an image, changes in position of specific points in an image, etc.

The data parameters relate to a first image and a second image, which are taken at a first time interval to be in a relationship of consecutive frames, and the generated images may vary depending on the data parameters.

The data parameters may include at least one of color perturbation, geometric warping, flow field transformation, and real-world effects.

The geometric warping may include at least one of rigid transformation, grid warping, and perspective warping. The rigid body transformation may include translations and rotations to align multiple images. The grid warping may partially transform an image by utilizing a grid of control points. The perspective warping may transform an image by taking perspective effects into account.

The real world effects may include at least one of texture noise, fog, and motion blur.

The first proxy network and the second proxy network may be networks trained to generate image change data based on multiple input images.

Specifically, the first proxy network may be a network that is previously trained to generate third image change data by inputting a third image and a fourth image, which are included in the obtained first image dataset and generated based on a second time interval, and to generate image change data in which a first loss function is minimized by calculating the first loss function based on first label data and the third image change data. The first label data may be extracted from the third image and the fourth image and the third image change data. The third image and the fourth image may be in a relationship of consecutive frames with each other.

Further, the second proxy network may be a network that is previously trained to generate fourth image change data by inputting a fifth image and a sixth image, which are included in the obtained second image dataset and generated based a third time interval, and to generate image change data in which a second loss function is minimized by calculating the second loss function based on second label data and the fourth image change data. The second label data may be extracted from the fifth image and the sixth image. The fifth image and the sixth image may be in a relationship of consecutive frames with each other.

Figure 2:
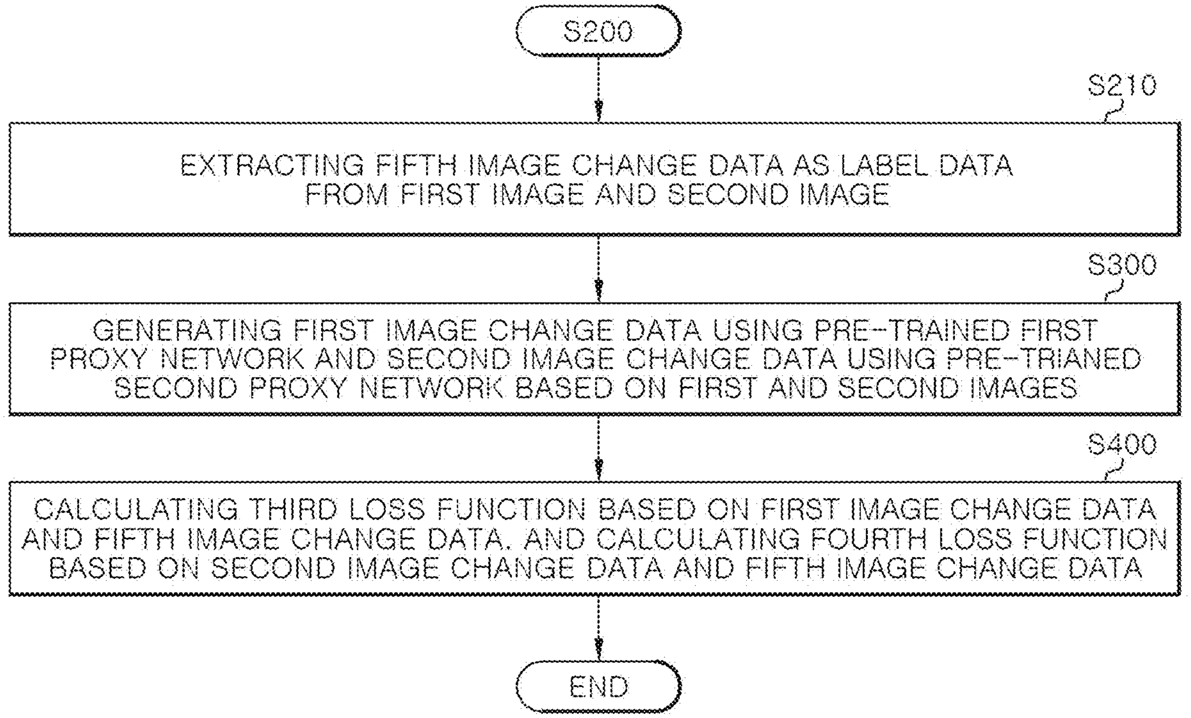
FIG. 2 is a flowchart illustrating a method of extracting label data and calculating a loss function in the image change data generating method according to the first embodiment of the present disclosure.

FIG. 2 is a flowchart illustrating a method of extracting label data and calculating a loss function in the image change data generating method according to the first embodiment of the present disclosure.

As shown in FIG. 2, the image change data generating method according to the first embodiment may further include extracting fifth image change data as label data from the first image and the second image (S210), and calculating a third loss function based on the first image change data and the fifth image change data and calculating a fourth loss function based on the second image change data and the fifth image change data (S400).

Here, a method for calculating a loss function based on label data and image change data generated using a proxy network will be described in detail in FIG. 10.

Figure 3:
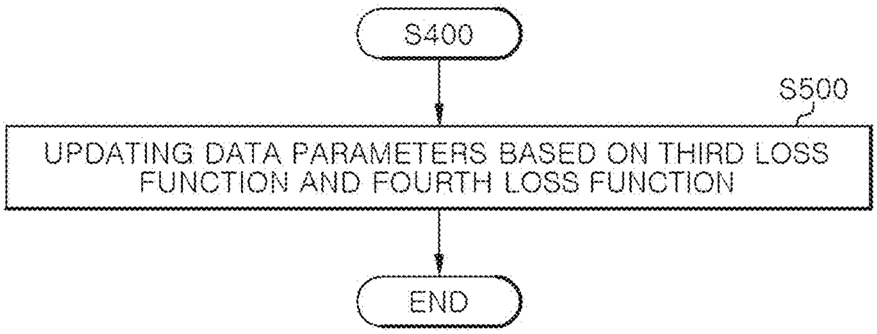
FIG. 3 is a flow chart illustrating a method of updating data parameters based on a loss function in the image change data generating method according to the first embodiment of the present disclosure.

FIG. 3 is a flow chart illustrating a method of updating data parameters based on a loss function in the image change data generating method according to the first embodiment of the present disclosure.

As shown in FIG. 3, the image change data generating method according to the first embodiment may further include updating data parameters based on the third loss function and the fourth loss function (S500).

A first proxy network may be a network previously trained based on several image data sets from which the user wishes to generate image change data. In this case, if there is an insufficient number of images from which the user wishes to generate image change data, there may be a problem in training a deep learning model to generate image change data based on the images.

This problem may be solved by introducing a second proxy network. Specifically, the second proxy network may be a network that is previously trained based on a large number of synthetic data sets. The first proxy network and the second proxy network may be replaced by a discriminator trained through contrastive learning.

Accordingly, in updating the data parameters, the data parameters may be updated so that the third loss function is minimized and the fourth loss function is maximized. That is, a user may update the data parameters by minimizing the third loss function corresponding to the first proxy network and maximizing the fourth loss function corresponding to the second proxy network, so that a distribution of the dataset on which the proxy network has been trained and a distribution of the generated image change data are similar.

In this case, since the first proxy network is a network that is previously trained by inputting multiple image datasets for which the user wishes to generate image change data, the first proxy network may be trained to minimize a loss function calculated for the user's target network.

In conclusion, the second proxy network pre-trained on a large number of synthetic datasets may be used to train an image change data generating network even when the number of target datasets held by the user is insufficient.

Figure 4:
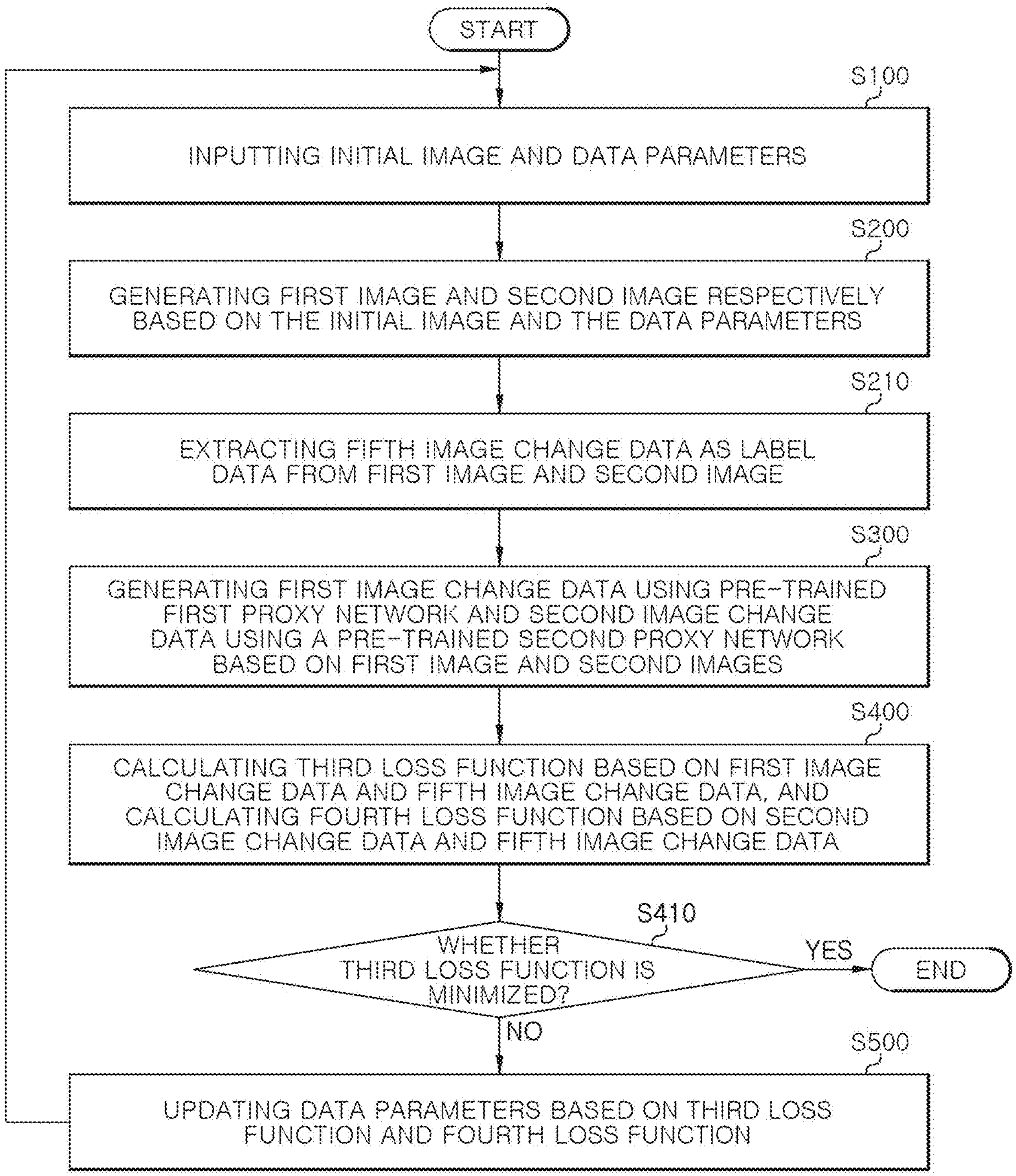
FIG. 4 is a flowchart illustrating how to repeatedly perform the image change data generating method according to the first embodiment of the present disclosure until a third loss function is minimized.

FIG. 4 is a flowchart illustrating an example of repeatedly performing the image change data generating method according to the first embodiment of the present disclosure until the third loss function is minimized.

As shown in FIG. 4, the image change data generating method according to the first embodiment may be repeatedly performed until the third loss function is minimized.

In this case, the image change data generating method according to the first embodiment may further include determining whether the calculated third loss function is minimized (S410).

When it is determined that the third loss function is minimized, the operation according to the image change data generating method may be terminated.

When it is not determined that the third loss function is minimized, the series of procedures involving updating the data parameters based on the third loss function and the fourth loss function (S500), re-inputting the updated data parameters (S100), generating first image and second image respectively based on the initial image and the data parameters (S200), generating image change data (S300), calculating a loss function (S400), and determining whether the calculated third loss function is minimized (S410) may be repeated.

Figure 5:
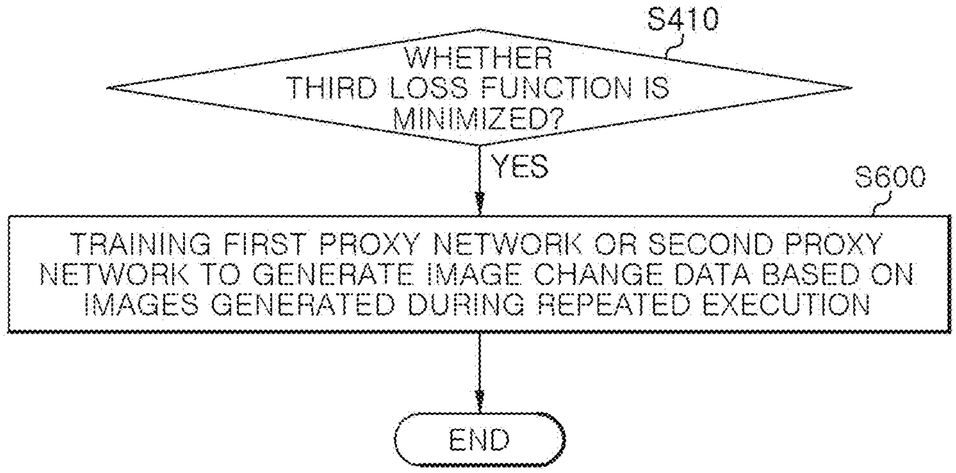
FIG. 5 is a flowchart illustrating a method for training a proxy network based on generated images when the third loss function is minimized in the image change data generating method according to the first embodiment of the present disclosure.

FIG. 5 is a flowchart illustrating a method for training a proxy network based on generated images when the third loss function is minimized in the image change data generating method according to the first embodiment of the present disclosure.

As shown in FIG. 5, when the third loss function is minimized, the first proxy network or the second proxy network may be trained to generate image change data based on images generated during the repeated execution (S600).

Figure 6:
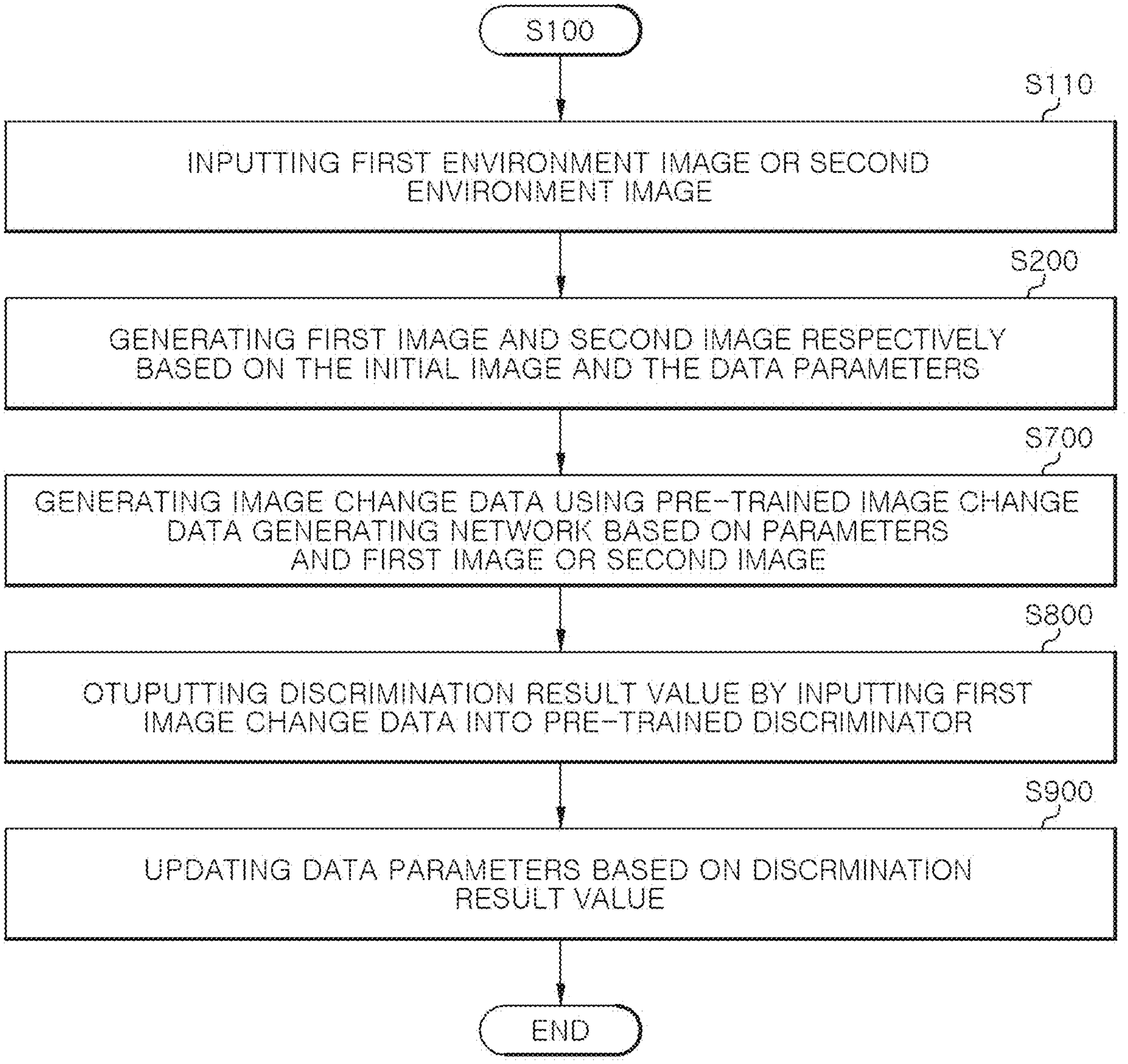
FIG. 6 is a flowchart illustrating an image change data generating method according to a second embodiment of the present disclosure.

FIG. 6 is a flowchart illustrating an image change data generating method according to a second embodiment of the present disclosure.

As shown in FIG. 6, the method of generating image change data according to the second embodiment of the present disclosure includes inputting data parameters (S100), inputting a first environment image or a second environment image (S110), generating a first image and a second image respectively, within a first time interval by using the data generator based on the data parameters and the first environment image or the second environment image, the first image and the second image being in a relationship of consecutive frames with each other (S200), generating image change data by using a pre-trained image change data generating network based on the data parameters and the first image and the second image (S700), outputting a discrimination result value by inputting the image change data into a pre-trained discriminator (S800), and updating the data parameters based on the discrimination result value (S900).

The discriminator may be pre-trained to determine whether the image change data generated based on either the first environment image or the second environment image by using the pre-trained image change data generating network. The first environment image may be generated by using the first proxy network and the second environment image may be generated by using the second proxy network.

In this case, adversarial learning may be used to train the discriminator. In other words, updating parameters may be guided by training the discriminator with an adversarial loss function. Accordingly, the discriminator may operate properly without labels of training data through adversarial learning.

The discriminator may output a first discrimination value when determining that image change data to be discriminated is data generated using the first proxy network, and may output a second discrimination value when determining that the image change data to be discriminated is data generated using the second proxy network.

For example, the discriminator may output 1 when determining that image change data to be discriminated is data generated using the first proxy network, and may output 0 when determining that the image change data to be discriminated is generated using the second proxy network.

The first proxy network and the second proxy network may be networks trained to generate image change data based on multiple input images.

Specifically, the first proxy network may be a network that is previously trained to generate third image change data by inputting a third image and a fourth image, which are included in the obtained first image dataset and generated based on a second time interval, and to generate image change data in which a first loss function is minimized by calculating the first loss function based on first label data and the third image change data. The first label data may be extracted from the third image and the fourth image and the third image change data. The third image and the fourth image may be in a relationship of consecutive frames with each other.

The second proxy network may be a network that is previously trained to generate fourth image change data by inputting a fifth image and a sixth image, which are included in the obtained second image dataset and generated based a third time interval, and to generate image change data in which a second loss function is minimized by calculating the second loss function based on second label data and the fourth image change data. The second label data may be extracted from the fifth image and the sixth image. The fifth image and the sixth image may be in a relationship of consecutive frames with each other.

The image change data generating method may be repeatedly performed until a discrimination result value becomes the same as the first discrimination value. For example, in a case where the discriminator outputs a first discrimination value of 1 when determining that image change data to be discriminated is data generated using the first proxy network, and a second discrimination value of 0 when determining that the image change data to be discriminated is data generated using the second proxy network, the discriminator may repeatedly perform a series of procedures involving inputting updated data parameters so that a discrimination result value reaches 1 (S100), generating images based on the updated data parameters (S110), generating image change data based on the data parameters and the first image and the second image (S700), outputting a discrimination result value (S800), and updating the data parameters based on the output discrimination result value (S900).

In this case, the first proxy network may be a network that is previously trained by inputting several image data sets from which the user wishes to generate image change data. Therefore, image change data may be generated by updating the data parameters until it is determined that the output discrimination result value is data generated using the user's target network.

Figure 7:
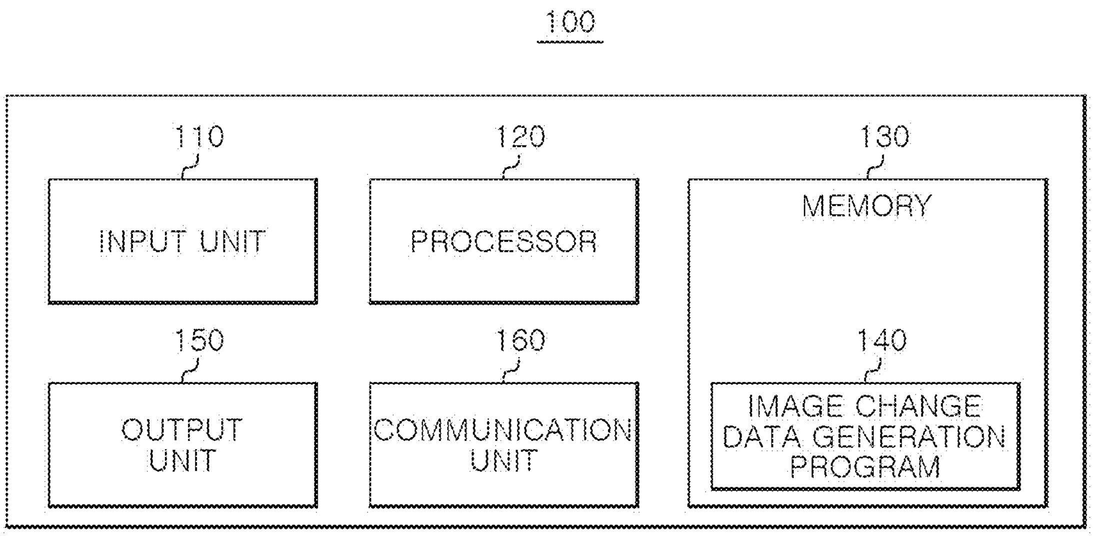
FIG. 7 is an exemplary diagram of an image change data generating apparatus according to a third embodiment of the present disclosure.

FIG. 7 is an exemplary diagram of an image change data generating apparatus according to a third embodiment of the present disclosure.

As shown in FIG. 7, an image change data generating apparatus 100 includes an input unit 110, a processor 120, and a memory 130, and may selectively further include an output unit 150 or a communication unit 160.

A user may input information required to generate image change data through the input unit 110. For example, the user may input data parameters for generating image or image change data through the input unit 110.

The processor 120 may control overall operations of the image change data generating apparatus 100 in order to implement the present disclosure.

In order to execute an image change data generation program 140, the processor 120 may load the image change data generation program 140 and information required for execution of the image change data generation program 140 from the memory 130.

The processor 120 may perform a control to store data in the memory 130 upon receiving data from an external device through the communication unit 160. In addition, the processor 120 may perform a control to transmit, to an external device through the communication unit 160, information including data parameters for generating image change data, first and second images generated based on the data parameters, first image change data and second image change data extracted from the first and second images and fifth image change data that is label data.

The processor 120 may refer to a processing device such as a microprocessor, a central processing unit (CPU), a graphic processing unit (GPU), a processor core, a multiprocessor, an application-specific integrated circuit (ASIC), a field programmable gate array (FPGA), a micro controller unit (MCU), and the like, but is not limited thereto.

The memory 130 may store the image change data generation program 140 and information required for execution of the image change data generation program 140. In addition, the memory 130 may store the results of processing by the processor 120.

The image change data generation program 140 may refer to software that includes instructions programmed to perform an image change data generation task.

The memory 130 may store information including data parameters for generating image change data, first and second images generated based on the data parameters, first image change data and second image change data extracted from the first and second images and fifth image change data that is label data. In addition, the memory 130 may store information received from an external device via the communication unit 160.

The memory 130 may refer to any non-transitory computer-readable storage medium including magnetic media such as a hard disk, a floppy disk and a magnetic tape, optical media such as a Compact Disc Read Only Memory (CD-ROM) and a Digital Versatile Disc (DVD), magneto-optical media such as a floptical disk, and a hardware device specially configured to store and execute a program instruction, such as a flash memory, but is not limited thereto.

The output unit 150 may display, as visual information through an interface or display means, information including data parameters for generating image change data, first and second images generated based on the data parameters, first image change data and second image change data extracted from the first and second images and fifth image change data that is label data.

A method by which the output unit 150 outputs information including data parameters for generating image change data, first images and second images generated based on the data parameters, first image change data and second image change data extracted from the first images and second images and fifth image change data that is label data may include various output forms, and is not limited to the embodiments described above.

The communication unit 160 may be a wireless communication module capable of performing wireless communication by employing a communication method such as CDMA, GSM, W-CDMA, TD-SCDMA, WiBro, LTE, EPC, wireless LAN, Wi-Fi, Bluetooth, Zigbee, Wi-Fi Direct (WFD), Ultra-Wide Band (UWB), infrared communication (IrDA), Bluetooth low energy (BLE), or near field communication (NFC), but is not limited thereto.

In addition, information input and output through the input unit 110 and the output unit 150, information stored in the memory 130, and information transmitted and received through the communication unit 160 include any information related to image change data generation of the present disclosure, and are not limited to the embodiments described above.

Functions and operations of the image change data generation apparatus 100, as performed by the processor 120, the memory 130, and the image change data generation program 140, will be discussed in detail with reference to FIG. 8.

Figure 8:
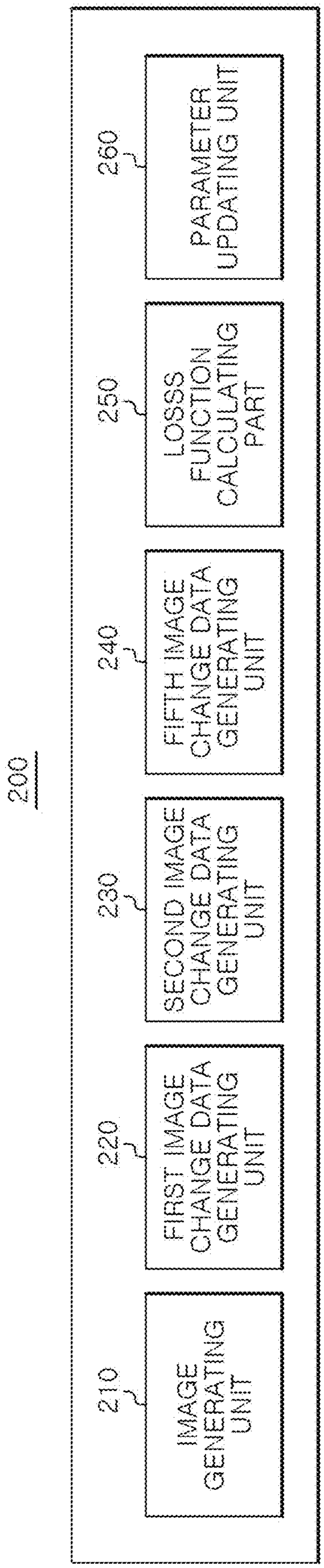
FIG. 8 is an exemplary diagram of a controller performing functions of the image change data generating apparatus according to the third embodiment of the present disclosure.

FIG. 8 is an exemplary diagram of a controller 200 performing functions of an image change data generating apparatus according to a third embodiment of the present disclosure.

As shown in FIG. 8, the controller 200 may include an image generating unit 210, an image change data generating unit 220, a second image change data generating unit 230, a fifth image change data generating unit 240, a loss function calculating part 250, and a parameter updating unit 260.

The image generating unit 210 may generate a first image and a second image respectively, with a first time interval based on input data parameters, the first image and the second image being in a relationship of consecutive frames with each other.

The first image change data generating unit 220 may generate first image change data using a pre-trained first proxy network based on the generated first and second images.

The second image change data generating unit 230 may generate second image change data using a pre-trained second proxy network based on the generated first and second images.

The fifth image change data generating unit 240 may extract fifth image change data as label data from the generated first and second images.

The loss function calculating part 250 may calculate a third loss function based on the first image change data and the fifth image change data. In addition, the loss function calculating part 250 may calculate a fourth loss function based on the second image change data and the fifth image change data.

The parameter updating unit 260 may update data parameters based on the third loss function and the fourth loss function.

The parameter updating unit 260 may update the data parameters, so that the third loss function is minimized and the fourth loss function is maximized.

Figure 9:
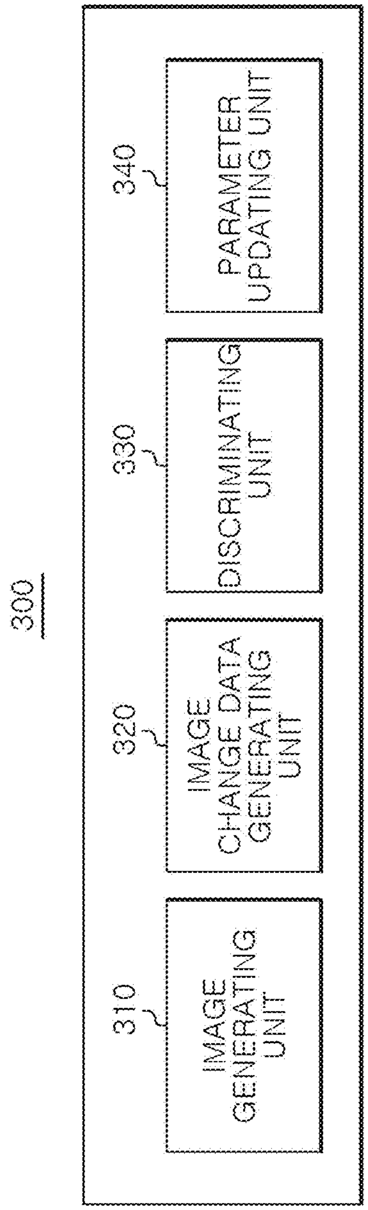
FIG. 9 is an exemplary diagram of a controller performing functions of an image change data generating apparatus according to a sixth embodiment of the present disclosure.

FIG. 9 is an exemplary diagram of a controller 300 performing functions of an image change data generating apparatus according to a sixth embodiment of the present disclosure.

As shown in FIG. 9, the controller 300 may include an image generating unit 310, an image change data generating unit 320, a discriminating unit 330, and a parameter updating unit 340.

The image generating unit 310 may generate first images and second images respectively, within a first time interval based on the initial image and the data parameters, the first image and the second image being in a relationship of consecutive frames with each other.

The image change data generating unit 320 may generate first image change data using a pre-trained first proxy network based on the generated first and second images.

The discriminating unit 330 may input the first image change data into a pre-trained discriminator and output a discrimination result.

The parameter updating unit 340 may update the data parameters based on the discrimination result.

The image generating unit 210, first image change data generating unit 220, second image change data generating unit 230, fifth image change data generating unit 240, loss function calculating part 250, parameter updating unit 260, image generating unit 310, first image change data generating unit 320, discriminating portion 330, and parameter updating unit 340 shown in FIGS. 8 and 9 are conceptual divisions of the functions of the image change data generating apparatus according to the third or sixth embodiment, but are not limited thereto.

According to an embodiment, the functions of the image generating unit 210, the first image change data generating unit 220, the second image change data generating unit 230, the fifth image change data generating unit 240, the loss function calculating part 250, the parameter updating unit 260, the image generating unit 310, The image change data generating unit 320, the discriminating unit 330, and the parameter updating unit 340 may be merged or separated and may be implemented as a series of instructions included in a single program.

The image generating unit 210, first image change data generating unit 220, second image change data generating unit 230, fifth image change data generating unit 240, loss function calculating part 250, parameter updating unit 260, image generating unit 310, and first image change data generating unit 320, discriminating unit 330, and parameter updating unit 340 may be implemented by the processor 120, and may refer to a data processing device embedded in hardware having physically structured circuitry to perform functions expressed by code or instructions contained within the image change data generation program 140 stored in the memory 130.

Figure 10:
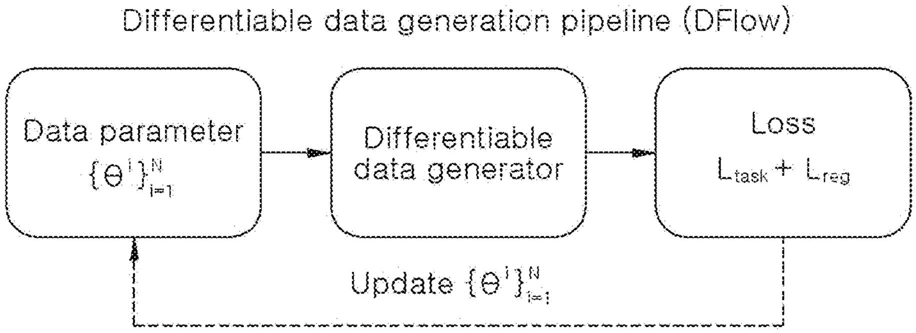
FIG. 10 is an exemplary diagram briefly showing an image change data generating method of the present disclosure.

FIG. 10 is an exemplary diagram briefly showing an image change data generating method of the present disclosure.

As shown in FIG. 10, an image change data generating method according to the present disclosure may include inputting data parameters, generating differentiable image data, calculating a loss function based on generated images, calculating a loss function based on the generated images, and updating the data parameters based on the loss function.

In this case, the loss function may be represented by Equation 1.

$$L_{total} = L_{task} + L_{reg} \quad \text{[Equation 1]}$$

Here, Ltotal denotes a total loss function. Ltask may be expressed as a relationship between Ltarget for the first proxy network and Lbase for the second proxy network, as shown in FIG. 15. In this case, a known loss function may be used to calculate Ltarget and Lbase. In FIG. 15, α, β, γ, and ∈ may be hyperparameters required during a learning process. Lreg may be represented by Equation 2.

$$L_{reg} = L_{grid} + L_{noise} \quad \text{[Equation 2]}$$

In this case, Lgrid may be represented by Equation 3 and Equation 4.

[Equation 3]

$$L_{grid} = \max\left(0, \sum_{k=1}^{w}\sum_{j=1}^{h-1}[C_t(k, j) - C_t(k, j+1)] + \sum_{k=1}^{w-1}\sum_{j=1}^{h}[C_c(k, j) - C_t(k+1, j)]\right)$$

In this case, Ct is coordinates warped by the geometric warping. Lgrid may compute a loss function in such a way that imposes a penalty the warped coordinates of a previous grid if the coordinates become larger than those of a next grid.

Lnoise may play a role in preventing too much noise in the image, and may be represented by in Equation 4.

$$L_{noise} = (\|N_t\|1 + \|N_{t+1}\|1) \quad \text{[Equation 4]}$$

In this case, Nt denotes the texture noise of a current frame, and Nt+1 denotes the texture noise of a next frame.

In addition, Ltotal may be defined as Ltarget for the image change data generating network targeted by a user, and data parameters may be updated accordingly as shown in Equation 5.

$$\{\theta^*\} = \text{argmin}_{\{\theta\}} \sum_i L_{target}(f_{target}(I_t(\theta_i), I_{t+1}(\theta_i)), F_{GT}(\theta_i)) \quad \text{[Equation 5]}$$

Figure 11:
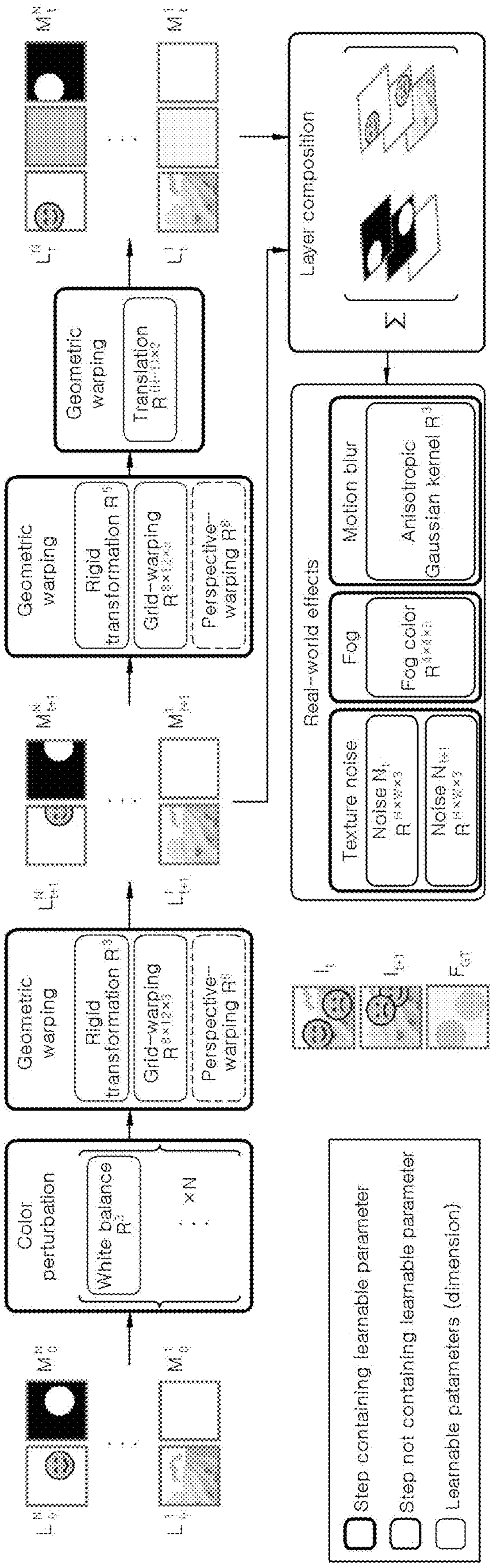
FIG. 11 is an exemplary diagram showing the process of generating images, which are taken at a specific time interval to be in a relationship of consecutive frames, based on data parameters.

In this case, θ denotes a data parameter, $I_t(\theta)$ and $I_{t+1}(\theta)$ denote images taken at a specific time interval to be in a relationship of consecutive frames, and $F_{GT}(\theta_i)$ denotes image change data for $I_t(\theta)$ and $I_{t+1}(\theta)$ FIG. 11 is an exemplary diagram showing the process of generating images, which are taken at a specific time interval to be in a relationship of consecutive frames, based on data parameters by using data generator.

As shown in FIG. 11, learnable data parameters to be reflected in image generation included in data generator, may include color perturbation, geometric warping, flow field transformations, a real-world effects. Each data parameter may be updated based on a loss function. A new image may be generated by re-inputting the updated data parameters.

Figure 12:
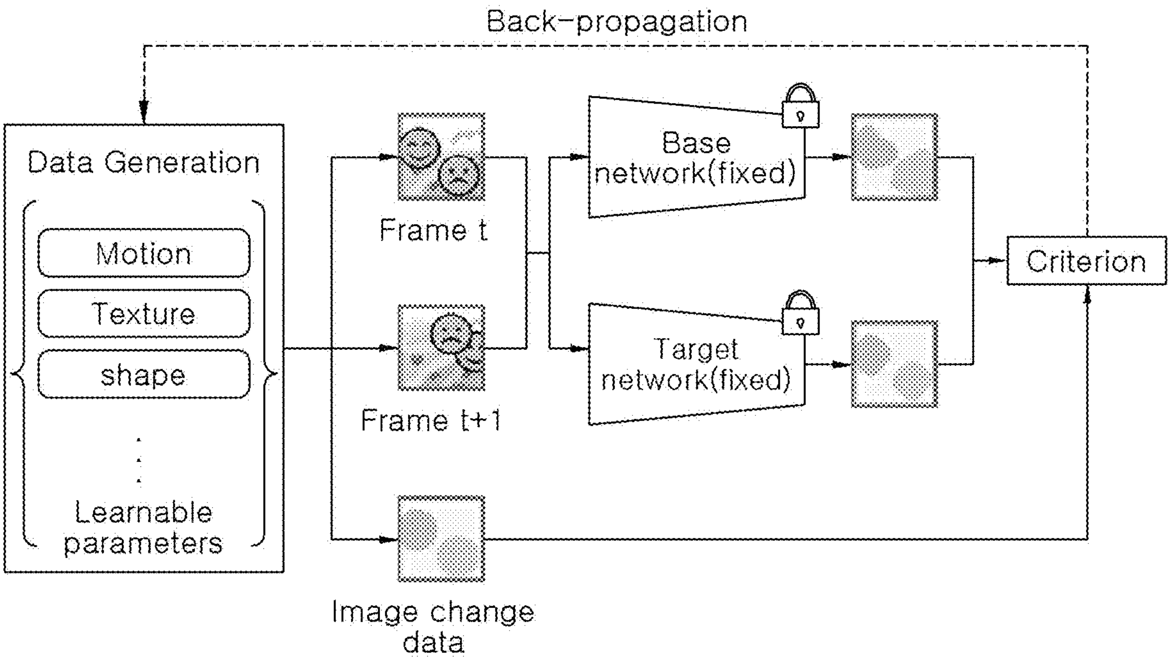
FIG. 12 is a flowchart illustrating in detail the image change data generating method according to the first embodiment of the present disclosure.

FIG. 12 is a flowchart illustrating in detail the image change data generating method according to the first embodiment of the present disclosure.

A target network and a base network may be networks that are previously trained to generate image change data based on multiple input images. Here, the target network may refer to the above-described first proxy network, and the base network may refer to the above-described second proxy network.

It is possible to generate images, which are taken at a specific time interval to be in a relationship of consecutive frames, based on the learnable data parameters and to generate image change data. In this case, the image change data may be used as label data for network learning.

When image change data is input to the target network and base network, respectively, the target network and base network may generate image change data, respectively.

A loss function may be calculated based on the image change data generated from the target network and base network and the image change data, which is the pre-generated label data, and the data parameters may be updated based on the calculated loss function.

The series of processes described above may be repeatedly performed until the loss function reaches a predetermined target value.

That is, loss function values of the base network and the target network may be compared, and the learnable parameters may be updated through backpropagation. In addition, the image change data may be rendered differentiable from the learnable parameters.

Figure 13:
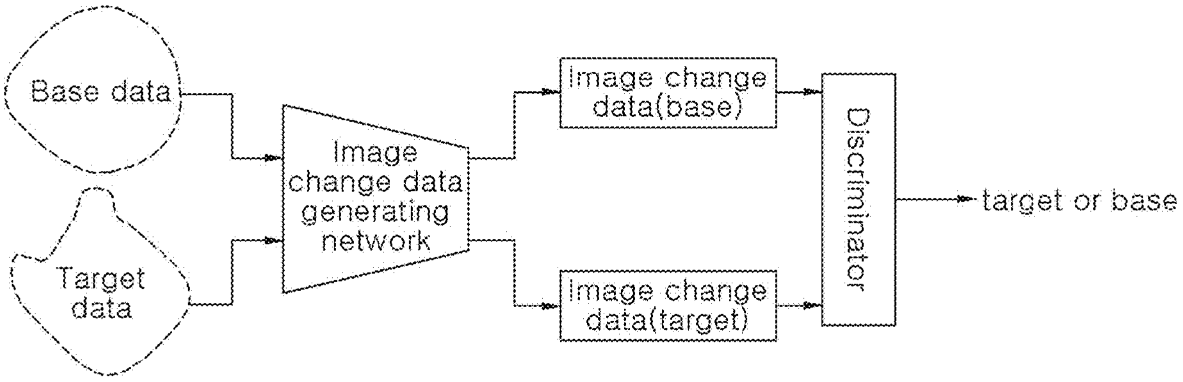
FIG. 13 is a flowchart conceptually illustrating a process in which a discriminator employed in an image change data generating method according to the second embodiment of the present disclosure is trained.

FIG. 13 is a flowchart conceptually illustrating a process in which a discriminator employed in an image change data generating method according to the second embodiment of the present disclosure is trained.

The discriminator may be trained to determine which of first environment consecutive images or second environment consecutive images are used as input for image change data generated by inputting consecutive images taken in a first environment to a trained arbitrary network and image change data generated by inputting consecutive images taken in a second environment to the trained arbitrary network. Here, the arbitrary network may refer to a network trained on arbitrary data that is different from the base data or target data. For example, when it comes to image change data that is generated by arbitrarily inputting base data or target data into a network trained to generate image change data based on arbitrary data different from the base data or target data, the discriminator may be trained to determine whether the image change data has been generated by inputting the base data or the target data.

The discriminator may output a first discrimination value when determining that the image change data generated using the pre-trained arbitrary network is data generated based on the first environment image data as input, and a second discrimination value when determining that the image change data generated using the pre-trained arbitrary network is data generated based on the second environment image data as input.

In this case, adversarial learning may be used to train the discriminator. In other words, updating parameters may be guided by training the discriminator with an adversarial loss function. Accordingly, the discriminator may operate properly without labels of training data through adversarial learning.

Figure 14:
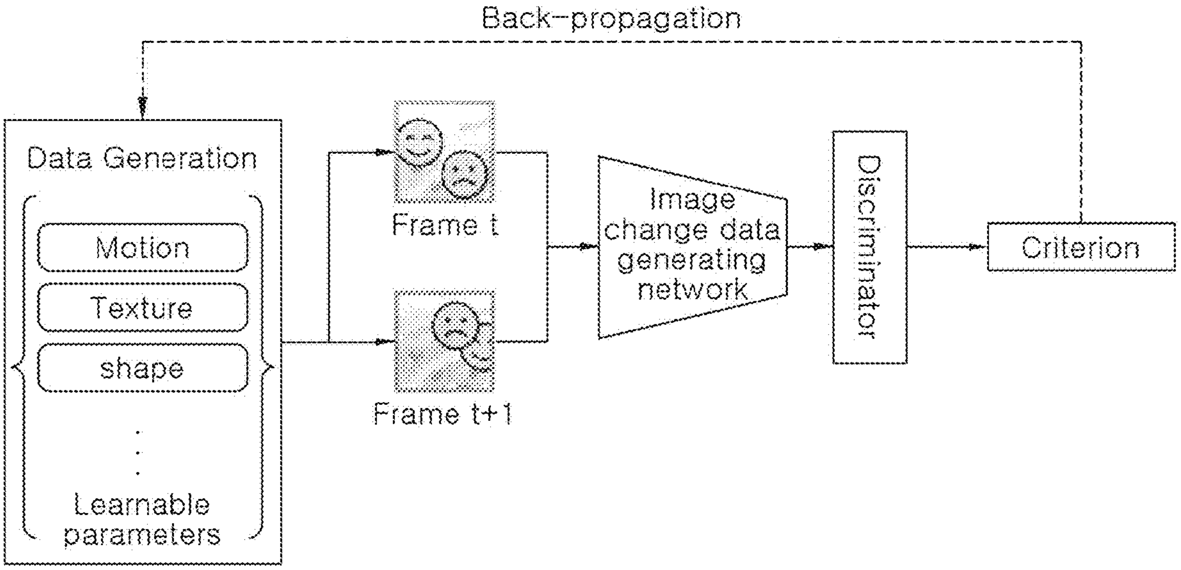
FIG. 14 is a flowchart illustrating in detail the method of generating image change data according to the second embodiment of the present disclosure.

FIG. 14 is a flowchart illustrating in detail the method of generating image change data according to the second embodiment of the present disclosure.

As shown in FIG. 14, in the image change data generating method according to the second embodiment of the present disclosure, a determination may be made on generated image change data based on a discrimination result value output from a discriminator, without label data, and data parameters may be updated based on the determination.

Images taken at a specific time interval to be in a relationship of consecutive frames may be generated based on learnable data parameters, and image change data may be generated by inputting the generated images into an image change data generating network. In this case, an arbitrary network may refer to a network trained with arbitrary data.

The discriminator may output a first discrimination value when determining that image change data to be discriminated is data generated based on first environmental image data as input, and a second discrimination value when determining that the image change data to be discriminated is data generated based on second environmental image data as input.

For example, in a case where the discriminator outputs the first discrimination value of 1 when determining that the image change data to be discriminated is data generated based on first environmental image data as input, and the second discrimination value of 0 when determining that the image change data to be discriminated is data generated based on second environmental image data as input, the discriminator may perform a series of procedures involving updating the data parameters through backpropagation so that the discrimination result reaches 1, generating images and generating image change data based on the generated images using an arbitrary network, outputting a discrimination result, and updating the data parameters based on the output discrimination result.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or non-transitory computer-readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for generating image change data to be performed by an image change data generating apparatus, the method comprising:

inputting an initial image and data parameters to a data generator;

generating a first image and a second image respectively, within a first time interval by using the data generator based on the initial image and the data parameters, the first image and the second image being in a relationship of consecutive frames with each other;

generating a first image change data by using a pre-trained first proxy network and a second image change data by using a pre-trained second proxy network based on the first image and the second image, extracting fifth image change data as label data from the first image and the second image; and updating the data parameters based on a third loss function calculated based on the first image change data and the fifth image change data, and a fourth loss function calculated based on the second image change data and the fifth image change data, wherein the pre-trained second proxy network is trained based on a larger amount of training data than training data used to train the pre-trained first proxy network, and wherein the data parameters are updated by minimizing the third loss function and by maximizing the fourth loss function.

2. The method of claim 1, wherein the pre-trained first proxy network is a network that is previously trained to generate third image change data by inputting a third image and a fourth image, which are included in a pre-obtained first image dataset and generated based on a second time interval, and to generate image change data in which a first loss function is minimized by calculating the first loss function based on first label data and the third image change data, wherein the first label data is extracted from the third image and the fourth image, the third image and the fourth image being in a relationship of consecutive frames with each other, and wherein the pre-trained second proxy network is a network that is previously trained to generate fourth image change data by inputting a fifth image and a sixth image, which are included in a pre-obtained second image dataset and generated based on a third time interval, and to generate image change data in which a second loss function is minimized by calculating the second loss function based on second label data and the fourth image change data, wherein the second label data is extracted from the fifth image and the sixth image, the fifth image and the sixth image being in a relationship of consecutive frames with each other.

3. The method of claim 2, wherein the updating the data parameters, updating the data parameters by calculating a task loss based on the third loss function and the fourth loss function to update the data parameters.

4. The method of claim 3, wherein the task loss is calculated based on at least one of following equations:

$$L_{target}\left(1-\alpha e^{\left(\frac{-\beta L_{base}}{L_{target}+\epsilon}+\gamma\right)}\right);$$

$$L_{target}\left(1+\alpha sigmoid\left(\frac{\beta L_{target}}{L_{base}+\epsilon}+\gamma\right)\right);$$

$$L_{target}\left(1+\alpha \tanh\left(\frac{\beta L_{target}}{L_{base}+\epsilon}+\gamma\right)\right);$$

$$L_{target}+\alpha e^{\left(\frac{-\beta L_{base}}{L_{target}+\epsilon}+\gamma\right)};$$

$$L_{target}+\alpha sigmoid\left(\frac{\beta L_{target}}{L_{base}+\epsilon}+\gamma\right);$$

and $$L_{target}+\alpha \tanh\left(\frac{\beta L_{target}}{L_{base}+\epsilon}+\gamma\right)$$

where Ltask denotes the task loss, Ltarget denotes the third loss function that is a loss function for the pre-trained first proxy network, Lbase denotes the fourth loss function that is a loss function for the pre-trained second proxy network, and $\alpha$, $\beta$, $\gamma$, $\epsilon$ are hyperparameters.

5. The method of claim 2, wherein the data parameters include at least one of color perturbation, geometric warping, flow field translation, and real world effects.

6. The method of claim 5, wherein the real world effects include at least one of texture noise, fog, and motion blur.

7. The method of claim 2, wherein image change data generated by the pre-trained first proxy network and the pre-trained second proxy network are optical flow data.

8. The method of claim 1, wherein the method is repeatedly performed until the third loss function is minimized.

9. The method of claim 8, further comprising:

training the pre-trained first proxy network or the pre-trained second proxy network to generate image change data based on images generated while the method is repeatedly performed, when the third loss function is minimized.

10. A method performed by an image change data generating apparatus, the method comprising:

inputting data parameters to a data generator;

inputting a first environment image or a second environment image to a data generator;

generating image change data by using a pre-trained image change data generating network based on the data parameters and either the first environment image or the second environment image;

outputting a discrimination result value by inputting the image change data into a pre-trained discriminator; and updating the data parameters based on the discrimination result value, wherein the image change data includes a first image change data generated based on the first environment image, or a second image change data generated based on the second environment image, wherein the pre-trained image change data generating network includes a pre-trained first proxy network configured to generate the first image change data and a pre-trained second proxy network configured to generate the second image change data, and wherein the pre-trained second proxy network is trained based on a larger amount of training data than training data used to train the pre-trained first proxy network.

11. The method of claim 10, wherein the pre-trained discriminator is trained to determine whether image change data generated by using the pre-trained image change data generating network is image change data generated the first using environment image or the second environment image, and wherein the pre-trained discriminator outputs a first discrimination value when determining that the image change data generated by using the first environment image, and a second discrimination value when determining that the image change data generated by using the second environment image.

12. The method of claim 11, wherein the method is repeatedly performed so that the discrimination result value reaches the first discrimination value.

13. The method of claim 11, wherein the pre-trained discriminator is pre-trained to determine whether image change data is generated based on the first environment image or the second environment image, by using an adversarial loss function, in order to provide a basis for updating the data parameters.

14. A non-transitory computer-readable storage medium storing computer-executable instructions stored therein, wherein the computer-executable instructions, when executed by a processor, cause the processor to perform a method, the method comprising:

inputting an initial image and data parameters to a data generator;

generating a first image and a second image respectively, within a first time interval by using the data generator based on the initial image and the data parameters, the first image and the second image being in a relationship of consecutive frames with each other; and generating a first image change data by using a pre-trained first proxy network and a second image change data by using a pre-trained second proxy network based on the first image and the second image, extracting fifth image change data as label data from the first image and the second image; and updating the data parameters based on a third loss function calculated based on the first image change data and the fifth image change data, and a fourth loss function calculated based on the second image change data and the fifth image change data, wherein the pre-trained second proxy network is trained based on a larger amount of training data than training data used to train the pre-trained first proxy network, and wherein the data parameters are updated by minimizing the third loss function and by maximizing the fourth loss function.

* * * * *